(12) United States Patent
Kim

(10) Patent No.: US 12,433,261 B2
(45) Date of Patent: Oct. 7, 2025

(54) ARTEMIA HATCHING-AND-SUPPLYING FULLY-AUTOMATED SYSTEM

(71) Applicant: Myung Bum Kim, Seoul (KR)

(72) Inventor: Myung Bum Kim, Seoul (KR)

( * ) Notice: Subject to any disclaimer, the term of this patent is extended or adjusted under 35 U.S.C. 154(b) by 3 days.

(21) Appl. No.: 18/290,469

(22) PCT Filed: Aug. 11, 2022

(86) PCT No.: PCT/KR2022/011970
§ 371 (c)(1),
(2) Date: Nov. 14, 2023

(87) PCT Pub. No.: WO2023/027392
PCT Pub. Date: Mar. 2, 2023

(65) Prior Publication Data
US 2024/0251764 A1  Aug. 1, 2024

(30) Foreign Application Priority Data
Aug. 25, 2021  (KR) ........................ 10-2021-0112171

(51) Int. Cl.
*A01K 61/59*  (2017.01)
(52) U.S. Cl.
CPC .................................... *A01K 61/59* (2017.01)
(58) Field of Classification Search
CPC ........ A01K 61/59; A01K 61/90; A01K 61/95; A01K 63/003; A01K 63/006
USPC ....................................................... 119/206
See application file for complete search history.

(56) References Cited

U.S. PATENT DOCUMENTS

| | | | | |
|---|---|---|---|---|
| 2,804,045 A | * | 8/1957 | Scott ...................... | A01K 61/59 119/206 |
| 2,920,606 A | * | 1/1960 | Anderson .............. | A01K 61/59 119/206 |
| 3,086,497 A | * | 4/1963 | Novello ................. | A01K 61/59 119/206 |
| 3,738,316 A | * | 6/1973 | Stasio .................... | A01K 61/59 119/206 |

(Continued)

FOREIGN PATENT DOCUMENTS

| | | |
|---|---|---|
| EP | 1304031 A1 | 4/2003 |
| JP | 2000-287576 A | 10/2000 |

(Continued)

OTHER PUBLICATIONS

International Search Report for PCT/KR2022/011970 mailed Nov. 25, 2022 from Korean Intellectual Property Office.

*Primary Examiner* — Zoe Tam Tran
(74) *Attorney, Agent, or Firm* — Revolution IP, PLLC

(57) ABSTRACT

The present invention relates to an *Artemia* hatching-and-supplying fully-automated system and includes: an *Artemia* hatching-and-supplying device for automatically collecting and supplying *Artemia* larvae; and a tilted transparent membrane window that is optionally detachably connected to the *Artemia* hatching-and-supplying device, wherein the *Artemia* hatching-and-supplying device comprises: a hatching tank in which *Artemia* larvae hatch from eggs; a collecting tank that collects only pure larvae and is connected to the hatching tank; and a square central passage that is formed adjunctively at the center of the rear wall of the hatching tank in order to connect the hatching tank and the collecting tank to a space.

9 Claims, 7 Drawing Sheets

(56) References Cited

U.S. PATENT DOCUMENTS

| | | | | |
|---|---|---|---|---|
| 4,389,974 A | * | 6/1983 | Dugan | A01K 61/59 |
| | | | | 119/206 |
| 5,143,019 A | * | 9/1992 | Zane | A01K 61/59 |
| | | | | 119/206 |
| 5,816,196 A | * | 10/1998 | Webster | A01K 61/90 |
| | | | | 119/228 |
| 2001/0045189 A1 | * | 11/2001 | McNeil | A01K 61/59 |
| | | | | 119/204 |
| 2003/0106499 A1 | | 6/2003 | Yamada | |
| 2024/0107987 A1 | * | 4/2024 | Boegner | A01K 61/95 |

FOREIGN PATENT DOCUMENTS

| | | | |
|---|---|---|---|
| KR | 200212310 Y1 * | 2/2001 | |
| KR | 20-0377187 Y1 | 3/2005 | |
| KR | 10-0927638 B1 | 11/2009 | |
| KR | 10-2012-0034408 A | 4/2012 | |
| KR | 20120034408 A * | 4/2012 | |
| KR | 10-2202636 B1 | 1/2021 | |
| WO | WO-03037077 A1 * | 5/2003 | A01K 61/005 |

\* cited by examiner

FIG. 7

| Classification TIME | Resting Egg Input time | Time Required for Each Step | (Feeding amount of fry/Input amount of resting eggs)*100 | | Feeding amount of fry when 10g is input each time | NOTE |
|---|---|---|---|---|---|---|
| | | | Initial feeding amount | Subsequent feeding amount | | |
| 24 Hours | Resting egg input | Hatching | | | | <Example> FOR FEEDING 4 TIMES A DAY, FIRST FEEDING AT 08:00 AT 4-HOUR INTERVALS (08:00, 12:00, 16:00, AND 20:00). TIMER SHOULD BE SET SUCH THAT AUTOMATIC FEEDER INPUTS RESTING EGGS TO HATCHING TANK 2.5 H BEFORE FIRST FEEDING TIME AT 6.5-HOUR INTERVALS AT 05:30, 12:00, 18:30, AND 01:00 |
| | | 2.5h Movement induction to collecting tank | | | | |
| | Resting egg input | 4h Fry feeding | 70% (24-hour Hatching rate of about 70%) | 100% (70%+30%) (Addition of 30% of existing unhatched eggs) | First 7g (Following 10g) | |
| | | 2.5h Movement induction to collecting tank | | | | |
| | Resting egg input | 4h Fry feeding | 100% | 100% | 10g | |
| | | 2.5h Movement induction to collecting tank | | | | |
| | Resting egg input | 4h Fry feeding | 100% | 100% | 10g | |
| | | 2.5h Movement induction to collecting tank | | | | |
| | | 4h Fry feeding | 100% | 100% | 10g | |

ARTEMIA HATCHING-AND-SUPPLYING FULLY-AUTOMATED SYSTEM

TECHNICAL FIELD

The present invention relates to an automated apparatus for hatching, larvae collection, and supply of *Artemia*, and relates to a fully-automated *Artemia* hatching and supplying system that performs 100% control and attenuation of a water flow in a movement passage to collect only pure larvae excluding foreign materials such as shells and cleans even fine impurities on the skin of larvae to then automatically supply the larvae to a fry and small fish rearing tank.

BACKGROUND ART

The conventional method of manually hatching and collecting *Artemia* (brine shrimp) is as follows. *Artemia* cysts, fresh water, salt, an air stone, a submersible heater, and the like are put into a transparent container (for example a plastic bottle), and after 24 to 30 hours, when hatched larvae start to fly, the air stone is stopped. Afterwards, when shells float on the water surface, the transparent container is covered with black paper (or black cloth), light is shined on the bottom, and the hatched larvae gather at the bottom, the hatched larvae are suctioned out directly using a dropper or are pulled out by attaching a valve below the transparent container. Such a method is based on the scientific fact that *Artemia* has a phototaxis ability to move along light.

Meanwhile, *Artemia* cysts products in which surfaces of resting eggs are coated with a powder have already been developed. Although these products are very expensive, the products are nevertheless being distributed and sold successfully all over the world. As in the previous paragraph, the products are also produced using a method of leaving only *Artemia* larvae by repeating an operation in which, after *Artemia* cysts hatch, a magnetic stick is manually put into a hatching tank, an iron-coated shell and unhatched eggs are attached to the magnetic road, separated, and cleaned with running water, and the magnetic stick is put into the hatching tank again to separate the iron-coated shell and unhatched eggs.

*Artemia* incubator products recently sold on the market use a method in which, without the use of an air stone, after a circular repeated fence-shaped structure is put into a flat container such as circular plate, and brine is poured into the flat container to a low level, *Artemia* cysts are put on an edge of the circular structure, and left, when the *Artemia* cysts hatch after 24 hours or more, *Artemia* larvae are allowed to come out and gather at the center of an aperture where light shines and are then retrieved.

The techniques described above are all performed manually, and since a collection and selection process is actually cumbersome and difficult, although a lot of time and effort are spent, it is difficult to ensure that foreign materials such as egg shells have been completely removed from collected larvae, and also, an inevitable problem arises in that an uneconomical aspect in which even *Artemia* cysts (unhatched resting eggs) that have not yet hatched are discarded along with the egg shells should be borne.

In addition, in order for mass hatching of *Artemia*, *Artemia* to be hatched cannot be fed all at once and thus should be frozen. Thus, there is a risk that the biological tissue or egg yolk of *Artemia* larvae may be destroyed due to the formation of ice crystals, and the *Artemia* larvae may deteriorate when thawed, which may cause water pollution in a fry and small fish rearing tank when the *Artemia* larvae are fed later.

In the case of recently released circular dish-shaped *Artemia* hatchers, it is not possible to use an air stone (of course, the product is designed to accommodate an air stone, but it is almost impossible to use the air stone due to the problem of egg shells penetrating a larval collection portion and mixing with larvae due to a water flow). Although oxygen supply (boiling) is an absolute condition for increasing a hatching rate, it is considered that the oxygen supply is abandoned due to technological limitations, and since only a very small amount of *Artemia* cysts are hatched, there is a functional limitation on mass hatching.

Meanwhile, continuous feeding is essential for the healthy rearing of fry. When fry are starving because their stomach cannot be filled even with just one meal, it may cause fatal problems in the growth of the fry, and thus continuous feeding of nutritious food determines the success or failure of raising fry.

However, since both hatching and supplying of *Artemia* have been manually performed until now, hatching and feeding of *Artemia* when raising fry are a task inevitably requiring a lot of attention, labor, and an enormous amount of time. Such difficult manual work and cumbersome processes inevitably reduce work efficiency and result in economic losses.

From the moment of hatching, an egg yolk is consumed for growth and starts to gradually disappear. When *Artemia* reaches adulthood, the entire egg yolk is consumed and disappears. As a result, *Artemia* is in a state that does not have an egg yolk, and thus it is known that even if fry consume *Artemia*, since the fry do not receive much nutrition, *Artemia* does not significantly assist in growing fry.

Currently, frozen *Artemia* larvae are commercialized and sold on the market, but it is difficult to ensure that the *Artemia* larvae are in the *Artemia* nauplius stage, which contains sufficient egg yolk. The reason is that for commercial and economic reasons based on a profit and loss calculation, a large amount of resting eggs should be hatched at once, in this case, since it is difficult to give up many unhatched eggs, excessive hatching time is inevitably given to prevent unhatched eggs, and since the focus should only be put on the production (volume) of larvae, there is no choice but to produce only larvae that have grown to a volume three times or more that of the initially hatched larvae and have reached adulthood. In this regard, selecting only early hatched larvae (*Artemia nauplii*) is an absolutely difficult task in mass hatching and production of frozen products.

Even if early hatched larvae (*Artemia nauplii*) are collected with an appropriate hatching time, all of the hatched larvae should be fed to fry within a short period of time, and most of the remaining hatched larvae are frozen. During a freezing process, there is a high possibility that the egg yolk and living tissue are destroyed and also deteriorate during a management process. When put into a water tank, the frozen larvae are rapidly thawed and the highly nutritious egg yolk is broken and dissolved in water. Thus, the dissolved egg yolk as well as biological tissues that were destroyed and fell off becomes a cause of water pollution, which eventually causes the death of fry. In order to prevent such a problem, more detailed water quality management and labor are required.

When hatched larvae are selected using the conventional method, constant efforts are made to select only the larvae as much as possible, but actually, perfect selection is impossible. There is a possibility that contaminants such as bacteria and germs may be present on surfaces of some egg shells, unhatched eggs, and decayed eggs mixed with hatched larvae, and when fry consume these foreign materials, it may cause serious diseases such as enteritis and ascites. Therefore, in some cases, it is recommended to clean resting eggs themselves before hatching. Considering such matters as a whole, there is a need for a previously unknown new concept of a fully-automated *Artemia* hatching and supplying system.

Related art documents in the technical field to which the present invention pertains include Korean Registered Utility Model Publication No. 20-0377187, Korean Patent Registration No. 10-0927638, and Korean Patent Registration No. 10-2202636.

DISCLOSURE

Technical Problem

The present invention is directed to providing an efficient and economical fully-automated *Artemia* hatching and supplying system in which, while only newly hatched *Artemia nauplii* are supplied in an appropriate amount at a set time, unhatched eggs remain in a hatching tank without any change and continue to hatch and thus are eventually induced to hatch, and a hatching rate is increased to prevent expensive *Artemia* cysts from being discarded and wasted.

The present invention is also directed to providing a fully-automated *Artemia* hatching and supplying system in which, by introducing a tilted transparent membrane window that attenuates and blocks a water flow, the inflow of foreign materials such as egg shells and unhatched eggs may be 100% preventable, and purely collected larvae may cleanly cleansed and then supplied to a fry tank.

Technical Solution

According to one embodiment of the present invention, a fully-automated *Artemia* hatching and supplying system includes an *Artemia* hatching and supplying device configured to automatically collect and supply *Artemia* larvae, and a tilted transparent membrane window optionally detachably connected to the *Artemia* hatching and supplying device, wherein the *Artemia* hatching and supplying device includes a hatching tank in which the *Artemia* larvae hatch from eggs, a collecting tank, which collects only pure larvae and is connected to the hatching tank, and a quadrangular central passage, which is adjunctively formed in a central portion of a rear wall of the hatching tank to spatially connect the hatching tank and the collecting tank.

The hatching tank includes a light-emitting diode (LED) light provided at an upper portion thereof, a submersible heater electric wire disposed under water to optionally generate heat, an air stone tube input portion, a detachable funnel mounting port configured to input resting eggs, and a cleaning discharge port provided at an end portion of a bottom of a lower portion thereof, wherein two silicone rings having a quadrangular shape are inserted into grooves in an inner wall of the central passage of the hatching tank and installed at a first entrance and a last entrance, and the tilted transparent membrane window is optionally inserted into the central passage.

A fry rearing tank supply discharge port and a brine discharge portion may be provided at a lower portion of the collecting tank.

The fully-automated *Artemia* hatching and supplying system may further include a back-to-back pushing door installed inside the collecting tank to block larvae from moving to the collecting tank during a hatching operation in the hatching tank.

The collecting tank may be fixed on an outer wall of the central passage of the hatching tank with a waterproof silicone packing inserted into a groove in the outer wall of the central passage and disposed therebetween using screw tightening, and a structure having a hinge structure connected to a passage may be provided inside the collecting tank, wherein the structure having the hinge structure in the collecting tank is mounted by inserting a silicone packing into a quadrangular groove and has a hinge ring portion on an upper wall thereof so that a hinge ring portion of the back-to-back pushing door is connected and installed to engage therewith.

The back-to-back pushing door may be an submersible installation pressure opening/closing door that prevents culture water of the hatching tank from flowing in through a mounting passage for the tilted transparent membrane window during a process of discharging or supplying brine or fresh water from or to the collecting tank and opens a passage such that the *Artemia nauplius* hatching in the hatching tank move to the collecting tank, and the back-to-back pushing door may operate to convert vertical downward movement, which is driven by a power of a motor outside water above the collecting tank, into horizontal movement and strongly push, press, and close a hinged door of the mounting portion for the tilted transparent membrane window.

An upper portion of an upper arm portion of the back-to-back pushing door may be connected to a linear motor and a lower portion thereof is connected to a lower arm portion, and the lower arm portion may have a streamlined tension structure to maintain smooth pressing and elasticity and perform a pressing function.

The back-to-back pushing door may include a transparent door plate connected to an upper wall of the central passage using a hinge and may be closed when an inner protrusion having a quadrangular shape is inserted into a wall groove and is in close contact with a waterproof silicone packing.

The tilted transparent membrane window may be a quadrangular-shaped submersible window having a form in which a plurality of transparent upper solid membranes and a plurality of transparent lower solid membranes are bonded and disposed in a column to be vertically inclined inward at an angle of 70° to form contact point gaps having an interval of 1.5 mm, and through a method in which, as soon as *Artemia nauplii* hatch from eggs, the *Artemia nauplii* instinctively react to light to move in a direction of light, and as the *Artemia nauplii* instinctively move, the *Artemia nauplii* slide on a transparent membrane inclination surface (70°) to move, and the *Artemia nauplii* may be guided to pass through the contact point gaps between the transparent upper solid membranes and the transparent lower solid membranes.

Through-holes having a diameter of 1 mm may be formed in upper ceilings of upper end portions of central portions of the transparent upper solid membranes in the tilted transparent membrane window, and a silicone hose may be connected to a first through-hole and drawn out to air above a water surface to be fixed to prevent air pockets from being generated inside the tilted transparent membrane window when brine is first supplied to the hatching tank.

Advantageous Effects

According to the present invention, there is an efficient and economical effect in which, while only newly hatched

*Artemia nauplii* are supplied in an appropriate amount at a set time, unhatched eggs remain in a hatching tank without any change and continue to hatch and thus are eventually induced to hatch, and a hatching rate is increased to prevent of expensive *Artemia* cysts from being discarded and wasted In addition, according to the present invention, by introducing a tilted transparent membrane window that attenuates and blocks a water flow, the inflow of foreign materials such as egg shells and unhatched eggs can be 100% preventable, and purely collected larvae can cleanly cleansed and then supplied to a fry tank.

DESCRIPTION OF DRAWINGS

FIG. 7 is a table of summarizing conditions according to the input of resting eggs.

MODES OF THE INVENTION

Figure 1:
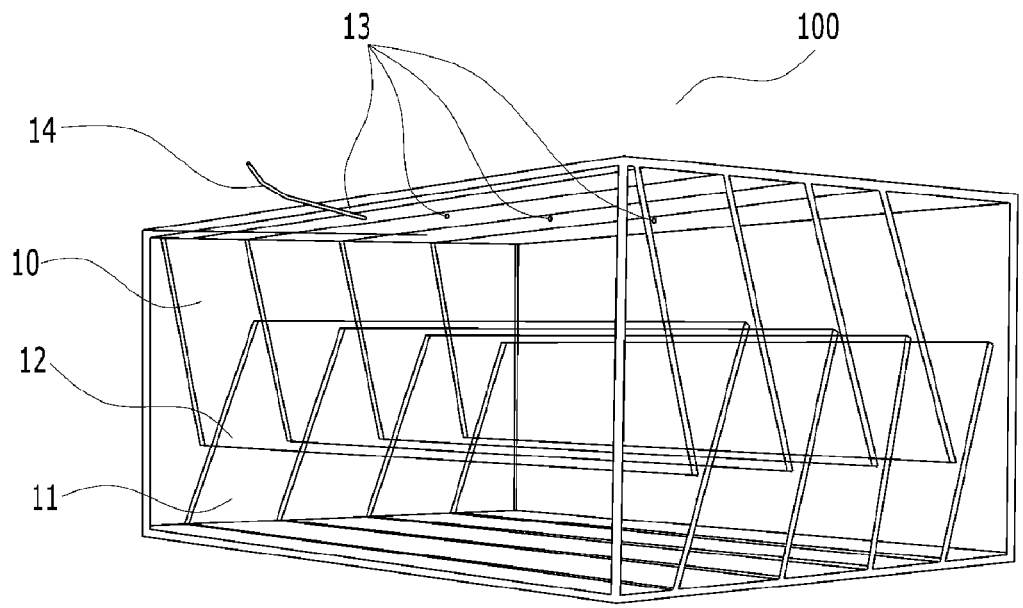
FIG. 1 is a perspective view of a tilted transparent membrane window.

The advantages and features of the present invention and methods of accomplishing the same will become apparent from the following description of the embodiments in detail, taken in conjunction with the accompanying drawings.

The present invention may, however, be embodied in many different forms and should not be construed as limited to the embodiments set forth herein.

In the present specification, the embodiments are provided so that this disclosure will be complete and will fully convey the scope of the invention to those skilled in the art. The present invention is only defined by the scope of the claims.

Therefore, well-known constituent elements, operations, and techniques are not described in detail in some embodiments to prevent the present invention from being unclearly interpreted.

Like reference numerals refer to like elements throughout the specification. The terms used herein are for the purpose of describing the embodiments only and are not intended to limit the present invention.

As used herein, the singular forms are intended to include the plural forms as well, unless the context clearly indicates otherwise. In addition, the terms "comprises," "comprising," "includes," and/or "including" used herein specify the presence of stated components and operations but do not preclude the presence or addition of one or more other components and operations.

Unless otherwise defined, all terms (including technical and scientific terms) used herein have the same meaning as commonly understood by one having ordinary knowledge in the art to which this invention belongs.

In addition, terms defined in commonly used dictionaries are not interpreted ideally or excessively unless they are defined.

Hereinafter, exemplary embodiments of the present invention will be described with reference to the accompanying drawings.

Figure 2:
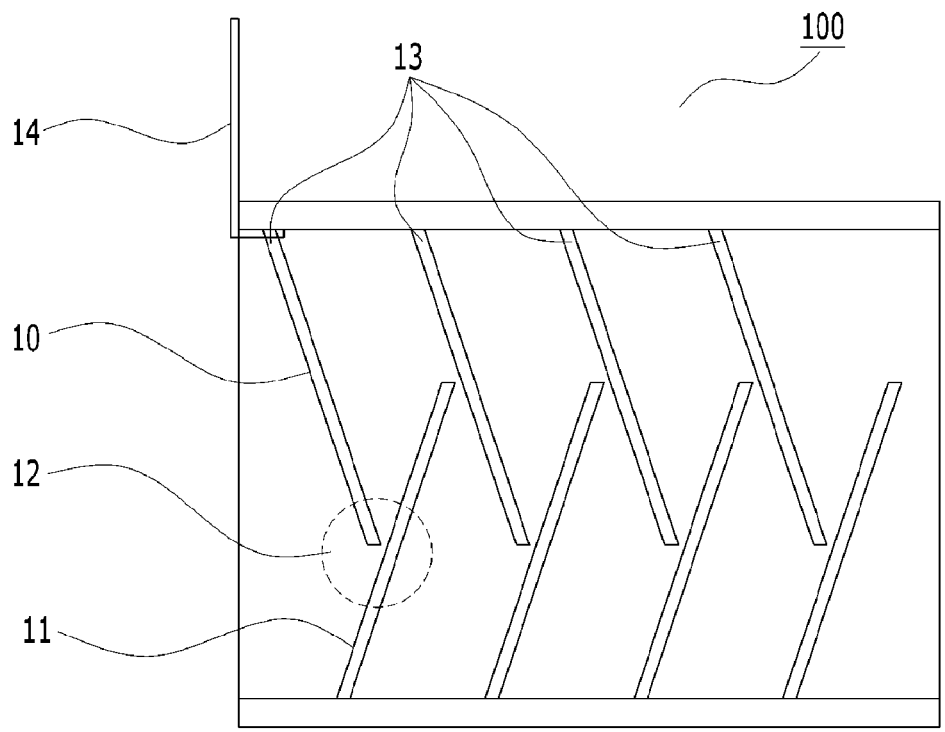
FIG. 2 is a side view of a structure of FIG. 1.
Figure 3:
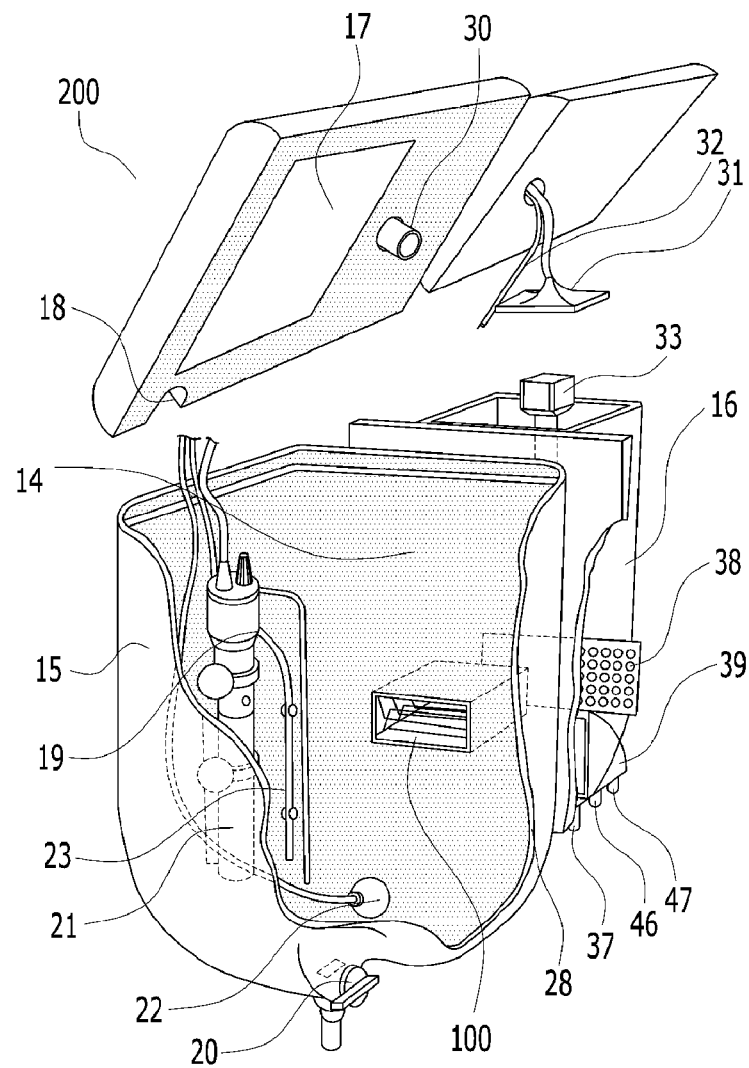
FIG. 3 is a view of a fully-automated *Artemia* hatching and supplying system according to one embodiment of the present invention.
Figure 4:
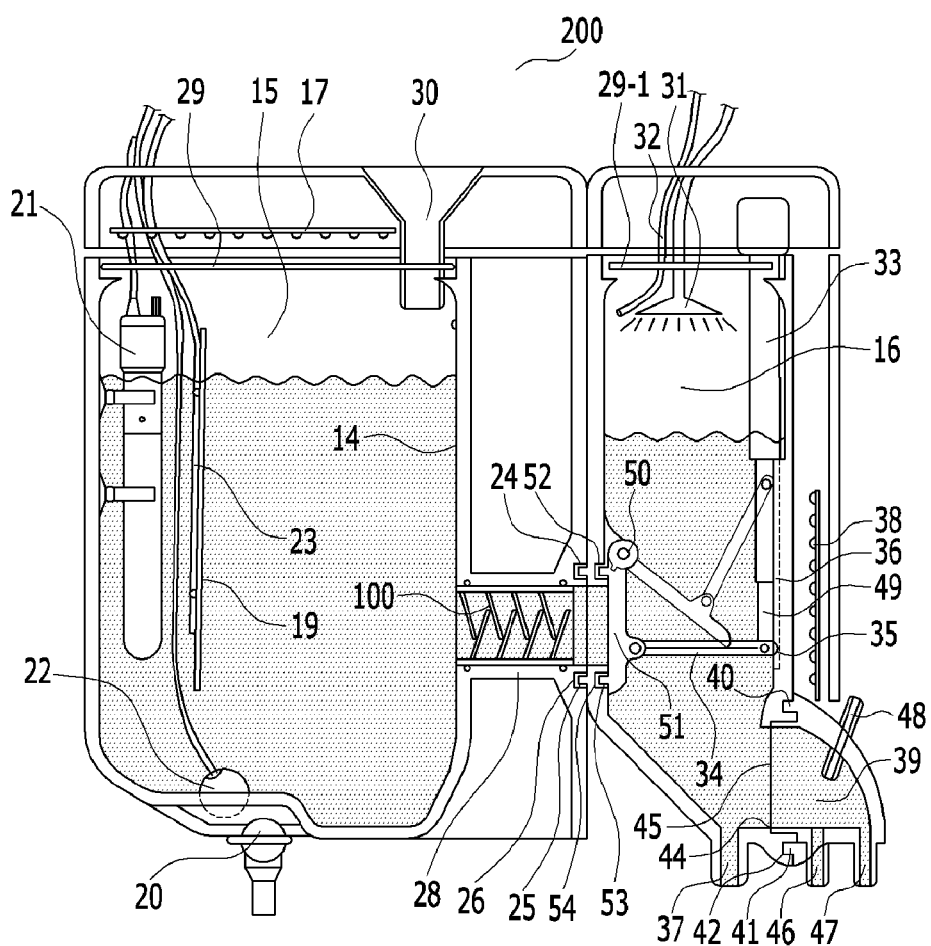
FIG. 4 is a partial side cross-sectional view of FIG. 3 for describing the operation of FIG. 3.
Figure 5:
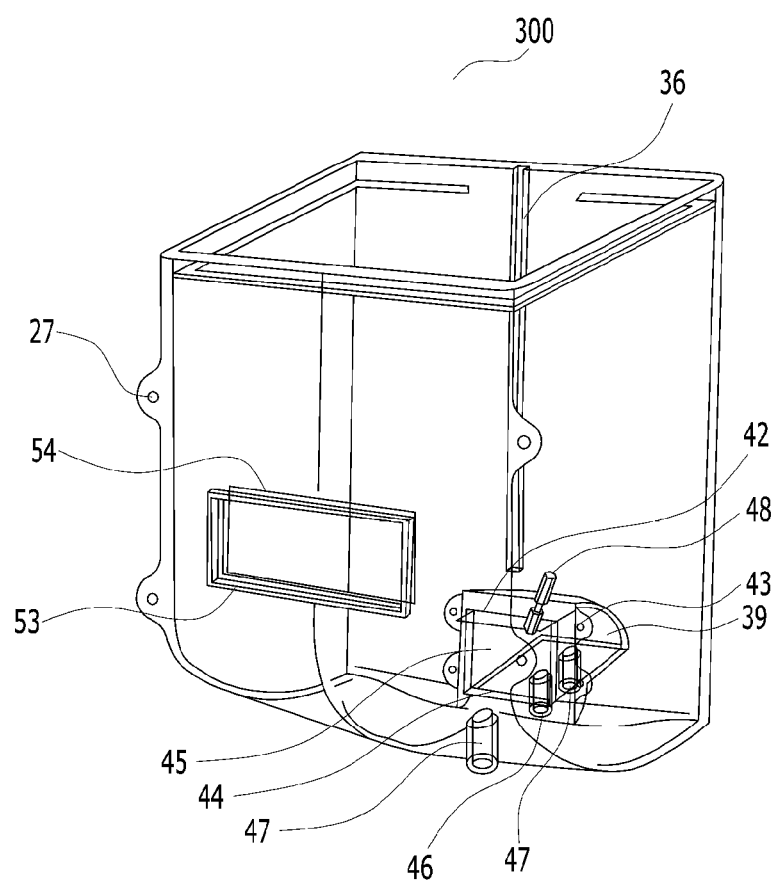
FIG. 5 is a view of a brine discharge portion of a collecting tank in the fully-automated *Artemia* hatching and supplying system according to one embodiment of the present invention.
Figure 6:
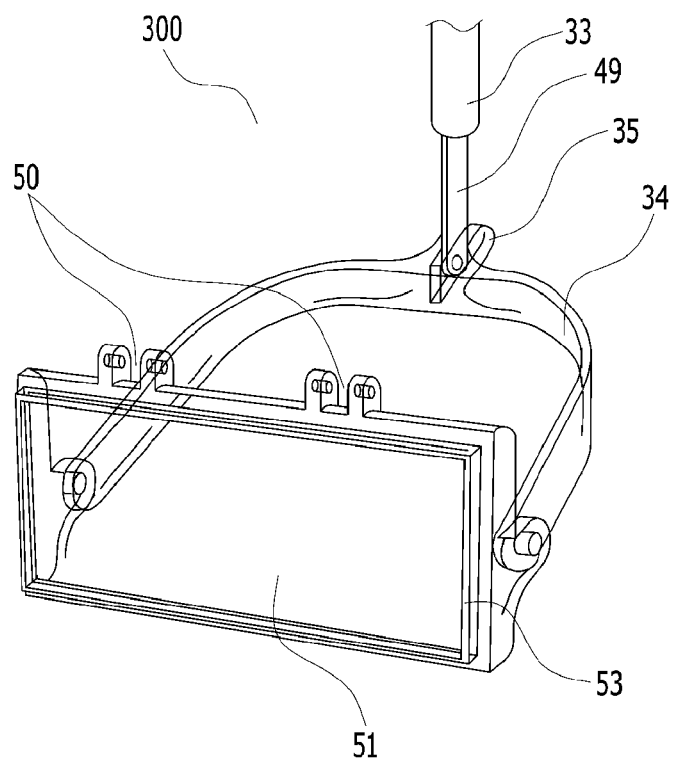
FIG. 6 is a view for describing a back-to-back pushing door.
Figure 8:
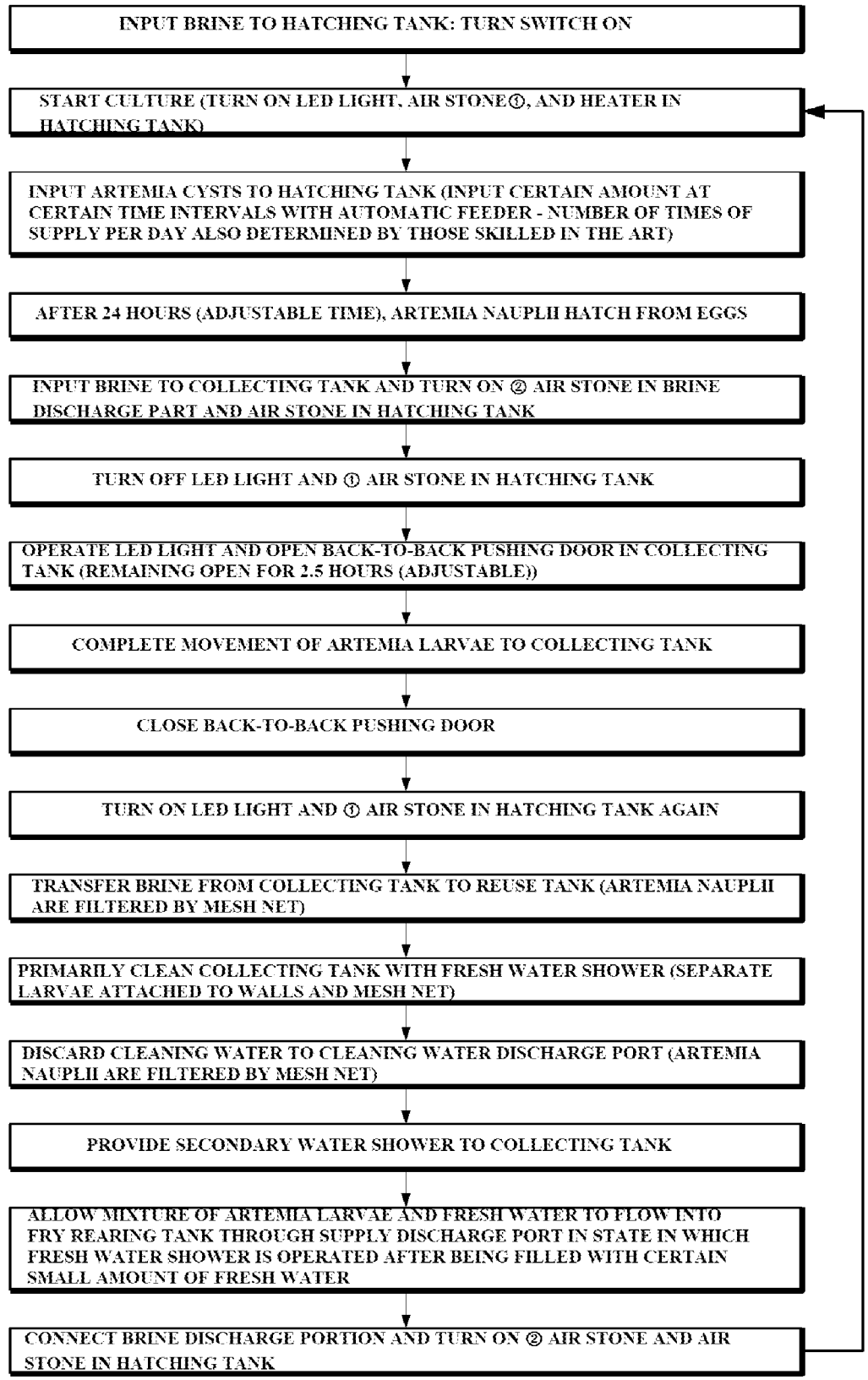
FIG. 8 shows an operation flow of the fully-automated *Artemia* hatching and supplying system.

FIG. 1 is a perspective view of a tilted transparent membrane window. FIG. 2 is a side view of a structure of FIG. 1. FIG. 3 is a view of a fully-automated *Artemia* hatching and supplying system according to one embodiment of the present invention. FIG. 4 is a partial side cross-sectional view of FIG. 3 for describing the operation of FIG. 3. FIG. 5 is a view of a brine discharge portion of a collecting tank in the fully-automated *Artemia* hatching and supplying system according to one embodiment of the present invention. FIG. 6 is a view for describing a back-to-back pushing door. FIG. 7 is a table of summarizing conditions according to the input of resting eggs. FIG. 8 shows an operation flow of the fully-automated *Artemia* hatching and supplying system according to one embodiment of the present invention.

Referring to the drawings, in the fully-automated *Artemia* hatching and supplying system according to the present embodiment, while only newly hatched *Artemia nauplii* are supplied in an appropriate amount at a set time, unhatched eggs remain in a hatching tank without any change and continue to hatch and thus are eventually induced to hatch. Thus, a hatching rate may be increased to prevent expensive *Artemia* cysts from being discarded and wasted.

In addition, in the fully-automated *Artemia* hatching and supplying system according to the present embodiment, by introducing a tilted transparent membrane window 100 that attenuates and blocks a water flow, the inflow of foreign materials such as egg shells and unhatched eggs is 100% preventable, and purely collected larvae may be cleanly cleansed and then supplied to a fry tank.

In particular, the fully-automated *Artemia* hatching and supplying system according to the present embodiment may eliminate economic inefficiencies due to as abandonment of unhatched eggs, collection of larvae that have consumed their egg yolk, enormous work time, and labor input that occur in conventional hatching and collecting methods.

When the fully-automated *Artemia* hatching and supplying system according to the present embodiment is applied, there is no need to, when fry are raised, purchase iron-coated *Artemia* cysts, which are about 7 times to 8 times higher more expensive than the current market price of general resting eggs. In addition, a more advanced method may be proposed by completely eliminating the inefficiency and uneconomicalness of a process of hatching existing iron-coated resting eggs and performing a repeated manual task with a magnetic stick as well as the risk of feeding larvae mixed with impurities.

In the fully-automated *Artemia* hatching and supplying system according to the present embodiment, all steps of hatching, collecting, and supplying may be performed simultaneously with full automation, thereby bringing incomparable efficiency to previous methods and also improving productivity to allow those skilled in the art to achieve maximum competitiveness and economic benefits.

The fully-automated *Artemia* hatching and supplying system according to the present embodiment, which may provide such effects, will be described with reference to FIGS. 1 to 6, in particular, FIGS. 3 to 5. The fully-automated *Artemia* hatching and supplying system according to the present embodiment may include an *Artemia* hatching and supplying device 200, which automatically collects and supplies *Artemia* larvae, and a tilted transparent membrane window 100, which is optionally detachably connected to the *Artemia* hatching and supplying device 200.

In the present embodiment, the *Artemia* hatching and supplying device 200 may perform 100% control and attenuation of a water flow in a movement passage by to collect only pure larvae excluding foreign materials such as shells, also clean fine impurities on the skin of the larvae, and then automatically supply the larvae to a fry and small fish rearing tank and may include a hatching tank 15 and a collecting tank 16.

The hatching tank 15 may be a matte black structure, and the collecting tank 16 may be a transparent container-shaped structure. The hatching tank 15 and the collecting tank 16 may be press-fixed and connected using screw tightening or a closed tie ring. Of course, this method is merely exemplary, and other methods may be applied.

A quadrangular-shaped protrusion of the collecting tank is inserted into a quadrangular groove in a rear wall of the hatching tank 15 and coupled to the quadrangular groove to be in close contact with a waterproof silicone packing 26 inserted into the quadrangular groove. A mounting portion (central passage) for a tilted transparent membrane window, which connects the interiors of two structures under water, and splash prevention membranes 29 at upper portions of the hatching tank and the collecting tank may be installed.

In the hatching tank 15, each of a light-emitting diode (LED) light 17, a heater 21, an air stone 22, and an air stone tube 23 are mounted at each position. The hatching tank 15 is a type of hatching device that provides appropriate salinity, water temperature, rays (light), water flow, and the like to *Artemia* cysts through the operations of the LED light 17, the heater 21, the air stone 22, the air stone tube 23, and the like to allow the *Artemia* cysts to normally hatch.

The hatching tank 15 has a central passage 28 connected to the collecting tank 16. A protrusion 25 of the collecting tank 16 may be pressed and coupled in close contact with the waterproof silicone packing 26 inserted into and mounted in a wall groove 24 of the hatching tank 15 using screw tightening 27 or a tie ring.

The tilted transparent membrane window 100 to be submerged under water is mounted in the central passage 28 in the form of a quadrangular passage of the hatching tank 15. That is, the tilted transparent membrane window 100 is optionally mounted in the *Artemia* hatching and supplying device 200.

The tilted transparent membrane window 100 is a quadrangular-shaped submersible window having a form in which a plurality of transparent upper and lower solid membranes 10 and 11 are bonded and disposed in a column to be vertically inclined inward (inclination surface (70°)) to form contact point gaps 12 with an interval of 1.5 mm.

Through a method, as soon as *Artemia nauplii* hatch from eggs, the *Artemia nauplii* instinctively react to light to move in a direction of light, and as the *Artemia nauplii* instinctively move, the *Artemia nauplii* slide on a transparent membrane inclination surface (70°) to move easily, and the *Artemia nauplii* may be guided to pass through the wide contact point gaps 12 of the transparent upper and lower solid membranes 10 and 11.

The contact points gaps 12 of the transparent upper and lower solid membranes 10 and 11 form gaps that are laterally wide and have an interval of 1.5 mm between the front and back. Since the arrangement of transparent membrane contact points has an opposite form of a bottleneck structure (reverse bottleneck structure) to absolutely attenuate and block the strength of incoming water flow, despite a strong water flow in the hatching tank 15 during boiling, excluding a light water flow inside an initial contact point, no water flow does not occur at all in a space between the initial contact point and a subsequent contact point.

Therefore, foreign materials such as egg shells, unhatched eggs, and decayed eggs are prevented from passing through the tilted transparent membrane window 100, and only *Artemia* larvae that slip through their own motor skills are collected in the collecting tank. As a result, a foreign material inflow rate reaches 0%.

The tilted transparent membrane window 100 may be detached or attached from or to the *Artemia* hatching and supplying device 200 and may be replaced at any time (easy maintenance) when contaminated by brine and impurities and when losing transparency for transmitting light. The tilted transparent membrane window 100 itself may be disassembled to separately clean the interior.

In an upper end portion of a central portion of each transparent upper membrane, a fine circular through-hole having a diameter of 1 mm may be formed to be attached to an upper ceiling. A silicone hose 14 (inner diameter: 1 mm; outer diameter: 2 mm) is connected to a first through-hole and drawn out to the air above the water. The silicone hose 14 allows air in the tilted transparent membrane window 100 to be discharged when the hatching tank is filled with brine (culture water), thereby preventing the occurrence of air pockets that may impede the movement of larvae.

In other words, in the tilted transparent membrane window 100, fine through-holes 13 with a diameter of 1 mm may be formed in central portions of the upper transparent solid membranes to be attached to the upper ceiling, and the silicone hose 14 (inner diameter: 1 mm; outer diameter: 2 mm) is connected to the first through-hole and drawn out to the air above the water and fixed. The silicone hose 14 functions to prevent the occurrence of air pockets inside the tilted transparent membrane window 100 when brine is first supplied to the hatching tank 15.

A cleaning discharge port 20 is formed, which includes a valve with a large lever such that there are as few grooves (dents in which eggs may be trapped) as possible on a bottom surface, is formed at a lower portion of the hatching tank 15.

The splash prevention membrane 29 is provided at an upper portion of the hatching tank 15. A funnel mounting portion 30 is formed in a funnel shape passing through an upper cover to serve as a direct passage for injecting resting eggs into culture water from an automatic feeder to be installed on the cover. The structure of the splash prevention membrane 29 may be equally applied to the collecting tank 16.

The collecting tank 16 is a guide supply device in the form of a transparent structure which guides and collects hatched *Artemia nauplii* from the hatching tank 15, performs a first shower with fresh water to clean the *Artemia nauplii*, performs a second shower with fresh water, and simultaneously supplies the *Artemia nauplii* to the fry and small fish rearing tank.

The collecting tank 16 includes an installation portion for a back-to-back pushing door 300, which may open or close the mounting portion for the tilted transparent membrane window 100 inside the collecting tank 16, a groove having a rail structure for vertical movement of an elbow or bearing wheel on a rear wall such that the back-to-back pushing door 300 operates, a shower, which is provided at an upper portion to spray brine into the collecting tank 16 when the brine flows in from the outside, a brine supply tube, and a linear movement motor (linear motor).

A discharge portion of the collecting tank 16 includes a fry rearing tank supply discharge port and a brine discharge portion. The fry rearing tank supply discharge port is a discharge port that allows pure larvae, from which various bacteria, fungi, and foreign materials that may be on bodies of the larvae are removed through primary cleaning, to flow into a fry rearing tank. The brine discharge portion is pressed, fixed, and connected to a lower portion of a rear surface of the collecting tank 16 using screw tightening or a closed tie ring and is fixed by inserting a mesh silicone packing into the contact portion area and pressing the mesh silicone packing.

The brine discharge portion may include a brine reuse discharge port, a fresh water cleaning water discharge portion, a mesh net installation portion, and an air stone installation portion.

The brine reuse discharge port is a discharge port for transferring brine to a brine tank for external supply before a fresh water cleansing process after larvae are guided, and the fresh water cleaning water discharge port is a discharge port for discarding cleaning water, with which primary cleaning is performed, to the outside for hygiene purposes before collected larvae are supplied to the fry rearing tank. An air stone of the brine discharge portion and the air stone tube of the hatching tank are coupled to the same oxygen supplier and operate together, and both generate minimum air bubbles to maintain the vitality of the larvae that have moved and some larvae remaining in the hatching tank. A manual valve or solenoid valve (electric valve) may be mounted on an external protrusion of each discharge port individually or in duplicate. The mesh net is positioned in a passage between the collecting tank and the brine discharge portion and is firmly installed when pressed and fixed. The mesh net is used to filter *Artemia* larvae during the reuse and discharge of brine and the discharge of fresh water cleaning water. In consideration of the size of the larvae, the mesh net has a size of 300 MESH (0.045 mm) or less, and a perimeter thereof is coated with silicone having a certain thickness to also serve as a waterproofing packing between the collecting tank and the brine discharge portion.

The shower 31, the brine supply tube 32, and the linear motor 33 are mounted at the upper portion of the collecting tank 16, and the back-to-back pushing door 300 is installed on the wall at the central passage.

A rail-shaped groove 36 along which an elbow 35 of a lower arm portion 34 of the back-to-back pushing door 300 moves is formed on a rear wall of the collecting tank 16. In addition, a fry rearing tank supply discharge port 37 is formed at a lower portion of the collecting tank 16, an LED light 38 is disposed on a rear external wall thereof to emit light that induces *Artemia nauplii*, and a brine discharge portion 39 is provided at a rear lower portion thereof.

The brine discharge portion 39 is connected between a groove 40 and a protrusion 41 of a lower portion of the rear wall of the collecting tank with a waterproof silicone packing 42 interposed therebetween using screw tightening 43 or a closed tie ring. In this case, a mesh net 45 treated with silicone packing is disposed in a mesh net installation portion 44, which is a contact portion. The mesh net 45 functions to filter larvae during the discharge of brine and fresh water from the collecting tank. In addition, the system further includes a brine reuse discharge port 46, a fresh water cleaning water discharge port 47, and an air stone installation portion 48.

The back-to-back pushing door 300 is an submersible installation pressure opening/closing door which prevents culture water of the hatching tank 15 from flowing in through a mounting passage for the tilted transparent membrane window 100 during a process of discharging or supplying brine or fresh water from or to the collecting tank 16 and also opens a passage such that *Artemia nauplii* hatched in the hatching tank 15 are movable to the collecting tank 16.

The back-to-back pushing door 300 has a form which converts vertical downward movement, which is driven by the power of a motor outside water above the collecting tank 16, into horizontal movement to strongly push, press, and close a hinged door of the mounting portion for the tilted transparent membrane window 100. In addition, the lower arm portion directly connected to the back-to-back pushing door 300 is provided to have a streamlined tension structure to ensure a pressing process to be smoothly performed while elasticity is maintained.

An upper portion of an upper arm portion 49 of the back-to-back pushing door 300 is connected to the linear motor 33 and a lower portion thereof is connected to the lower arm portion 34. The lower arm portion 34 has a streamlined tension structure to perform a pressing function by maintaining smooth pressing and elasticity. The lower portion of the upper arm portion 49 is connected to the lower arm portion 34 and the upper portion thereof is connected to the linear motor 33.

An elbow portion of the upper arm portion 49 is allowed to move along a vertical groove recessed in the rear wall of the collecting tank 16. A bearing wheel may also be mounted at the elbow portion of the upper arm portion 49.

The back-to-back pushing door 300 includes a transparent door plate 51 connected to an upper wall of the central passage 28 using a hinge 50 and has a structure, which is closed when an inner protrusion 53 having a quadrangular shape is inserted into a wall groove 52 and comes into close contact with a waterproof silicone packing 54. The door plate 51 is a transparent solid plate, a connection portion for the lower arm portion is provided at a central lower portion thereof, and an upper portion of the door plate is connected to an upper wall of the mounting portion for the tilted transparent membrane window 100 of the collecting tank 16 using a sturdy hinge.

In order to operate the fully-automated *Artemia* hatching and supplying system according to the present embodiment, a state in which the back-to-back pushing door 300 in the collecting tank 16 is closed and sealed is checked, and then an appropriate amount of brine is input to the hatching tank 15.

Afterwards, when a culture start switch is turned on, the LED light 17 installed at a lower end portion of the upper cover of the hatching tank 15, the air stone 22 installed inside through an upper cover installation groove 18, and an submersible heater 21 receive power and turned on.

The hatching tank 15 is a matte black structure, and a cover film 19 is provided on a side wall on which the submersible heater 21 is mounted, and thus when light for inducing the movement of larvae is incident, light is prevented from being reflected or scattered on a glass surface, thereby allowing *Artemia nauplii* to more smoothly move.

Meanwhile, a funnel-shaped through-hole 30 for guiding *Artemia* cysts to the hatching tank is formed in the upper cover of the fully-automated *Artemia* hatching and supplying system according to the present embodiment.

Accordingly, a feeding funnel is installed and an automatic feeder with a timer is installed outside so that a certain amount can be put into the funnel at certain intervals. For example, since fry food is usually supplied four times a day at 4-hour intervals, an *Artemia* cyst input time is four times at 6.5-hour intervals, and a supply amount may be determined by those skilled in the art according to a fry rearing environment, which are summarized in a diagram of FIG. 7.

When *Artemia* cysts are input to the operating hatching tank 15, the *Artemia* cysts are stimulated by a strong water flow with appropriate water temperature and salinity and a strong irradiation amount (LED light) and start to move (boiling). After 24 hours, although there are slight differences according to *Artemia* cyst products, 70% or more of the *Artemia* cysts are hatched to actively move, and the rest are unhatched, are just about to hatch from an egg membrane, or are just hatched and thus have no or weak self-mobility and are in a state of being pushed and moved by a water flow.

In this case, the tilted transparent membrane window 100 installed in the central passage 28 of the hatching tank 15 is exposed to an underwater environment in which a strong water flow is formed, but the transparent solid membranes of the tilted transparent membrane window 100 are vertically arranged and built in a reverse bottleneck structure to rapidly attenuate or block a water flow in the window, and thus even at strong boiling, *Artemia* cysts are not introduced at all.

[Example 1]: Water Flow Attenuation Experiment in Space Between Upper and Lower Transparent Membranes of Tilted Transparent Membrane Window 100

(1) Method: After the tilted transparent membrane window is installed in a transparent quadrangular container, and a rear passage of the tilted transparent membrane window is blocked with tape, the quadrangular container is filled with water to completely and deeply submerge the tilted transparent membrane window in water, and then 5 g of *Artemia* cysts and two air stones are put therein to strongly boil bubbles for 2.5 hours and generate a strong water flow, which causes the *Artemia* cysts to fly and move in all directions.

(2) Results:
① The inside being boiled was observed through the transparent quadrangular container, and it was confirmed that a very fine water flow occurred near a first contact point gap between the upper transparent membrane and the lower transparent membrane, but the water flow did not affect subsequent contact points, and there was no water flow at all from a subsequent space.
② After 2.5 hours, the inside of the tilted transparent membrane window was observed, and it was confirmed that resting eggs and any foreign materials could not penetrate into an inner space.

Experiment 1

After 24 hours of hatching induction (about 70% hatching), brine is automatically supplied to the collecting tank 16 from the outside of the system through the brine supply tube 32 according to system programming, and the hatching tank 15 is filled with the brine at the same level as a water level of the hatching tank 15 (an electric floating switch can be used to adjust the water level using a submersible motor in an external supply brine tank).

In this case, the air stone of the brine discharge portion 39 in the collecting tank 16 and ② the air stone tube 21 of the hatching tank were turned on to supply a minimum amount of oxygen such that the movement of the larvae is not hindered. Next, the LED light 17 and ① the air stone 22 of the hatching tank 15 are turned off, the LED light 38 installed on the rear wall of the collecting tank 16 is immediately turned on.

The back-to-back pushing door 300 under water in the collecting tank 16 is opened, and the central passage 28 equipped with the tilted transparent membrane window remains open for 2.5 hours, and the submersible centers of the hatching tank 15 and the collecting tank 16 are spatially connected (an open maintenance time can be adjusted by those skilled in the art).

After 2.5 hours, 95% or more of the *Artemia nauplii* that have just hatched and started swimming move from the dark hatching tank 15 to the collecting tank 16, in which the guide LED light 38 is turned on, through the tilted transparent membrane window 100 installed under water in the central passage 28.

The tilted transparent membrane window 100 has a configuration in which the transparent solid membranes 10 and 11 are bonded and disposed at upper and lower portions of the inside in the form of a quadrangular passage to be inclined inward at an angle of 70° in a direction of the collecting tank 16, and thus, when movement is guided, light may be easily transmitted, and also larvae reacting to light swim and move and slip on surfaces of the inclined solid membranes 10 and 11 to enter the interior through the contact point gap 12 (1.5 mm). In this case, foreign materials such as egg shells and unhatched eggs that do not have self-motility do not flow in.

[Example 2]: *Artemia* Larvae Movement, Required Time, and Movement Rate Experiment (1) Method: The temporarily manufactured hatching tank and collecting tank are bonded, the central passage is formed to insert the tilted seal transparent membrane window, the tilted transparent membrane window is completely sealed such that there are no gaps between walls and the outside of the tilted transparent membrane window, and then the passage in a direction of the collecting tank is blocked with transparent tape.

After brine is put into two quadrangular containers, 5 g of *Artemia* cysts are put into the hatching tank, one air stone is input and operated, and a water temperature is maintained at a temperature of 26° C. with an submersible heater, and an LED light at an upper side is turned on to wait for 24 hours.

When a required time has elapsed, the air stone in the hatching tank, the submersible heater, and the LED light are immediately turned off, the transparent tape attached to the tilted transparent membrane window is removed, and then an LED light is installed on an outer wall surface of the collecting tank to transmit strong light to the hatching tank through the tilted transparent membrane window and guide movement of larvae.

(2) Results:
① It was confirmed that, after 24 hours from the start of hatching, about 70% of the *Artemia* cysts in the hatching tank hatched.
② When 2.26 hours had elapsed from the start of guiding the movement of the larvae, it was confirmed that 95% or more of *Artemia nauplii* had completed the movement from the hatching tank to the collecting tank and that egg shells and unhatched eggs were not mixed at all (foreign material inflow rate of 0%).

When collection is completed, the back-to-back pushing door 300 in the collecting tank 16 is closed. The inside of the central passage 28 and the collecting tank are sealed and blocked under water, and the LED light 17 and ① the air stone 22 of the hatching tank 15, which is turned off for 2.5 hours, are turned on again.

The upper arm portion 49 of the back-to-back pushing door 300 is connected to the linear motor 33 to receive vertical movement, the vertical movement is converted into horizontal movement at the lower arm portion to press and close the central passage 28 in the wall of the collecting tank 16, and thus the elbow 35 (or bearing wheel) at an end portion of the upper arm portion 49 is provided to slide along the rail-shaped groove 36 in the rear wall of the collecting tank, thereby ensuring the stability of vertical movement.

Immediately, the brine reuse discharge port 46 of the brine discharge portion 39 mounted in the collecting tank 16 is opened to discharge brine in the collecting tank 16 to the external supply brine tank. Brine of the external supply brine tank is reused when brine is input to the collecting tank 16 using a submersible motor. In this case, the *Artemia nauplii* in the collecting tank 16 are filtered through the mesh net 45 and remain in the brine discharge portion without any change.

Next, the air stone (mounted in the air stone installation portion 48) in the brine discharge portion 39 is turned on, and fresh water is sprayed and supplied in the form of a spray from the upper shower 31 of the collecting tank 16 to clean larvae. When the collecting tank 16 is filled with ⅓ of a supply amount of brine, the fresh water supply is stopped, and boiling cleaning is performed for 10 seconds, and then cleaning water is discarded to the outside through the fresh water cleaning water discharge port 47. In this case, larvae are filtered again through the mesh net 45.

Then, when secondary second fresh water shower supply is performed, and the collecting tank 16 is filled with ⅓ of a supply amount of fresh water, without stopping a fresh water shower (larvae attached to a wall being washed), the fry rearing tank supply discharge port 37 is opened to inject fresh and clean *Artemia nauplii* into the fry rearing tank (for about 6 seconds) and supply the fresh and clean *Artemia nauplii* to fry and small fish. When the supply and discharge are completed, an air stone in the brine discharge portion 39 is turned off, and a primary process is ended.

Subsequently, the program returns to an operation of turning on the LED light 17 and the air stone 22 in the hatching tank 15, a hatching operation is consecutively performed, and a secondary process is started. The automatic feeder installed at an upper portion of the device 200 inputs *Artemia* cysts to the hatching tank through a funnel, the *Artemia* cysts are mixed with *Artemia* cysts that are already hatching and are subjected to a hatching process.

After 4 hours, brine is input to the collecting tank 16 again, and each process is automatically repeated while proceeding to an operation of inputting *Artemia* cysts to the hatching tank according to the set number of times of supply per day in the fry rearing tank.

A supply time interval for *Artemia nauplii* in the fry rearing tank is 4 hours. Only when a feeder timer is set at the same time interval, newly hatched and highly nutritious *Artemia* larvae may be sequentially supplied.

Since it takes 2.5 hours to guide *Artemia nauplii*, an interval of the input of *Artemia* cysts to the hatching tank should be 6.5 hours. In this case, the reason for a difference between a larval intake time of fry in the fry rearing tank and a time interval for inputting *Artemia* cysts to the hatching tank is that the functions of the hatching tank are turned off during a time (2.5 h) for guiding to the collecting tank so that unhatched eggs do not receive much hatching stimulation.

According to the fully-automated *Artemia* hatching and supplying system of the present embodiment, which operates based on a structure described above, there is an efficient and economical effect in which, while only living and newly hatched *Artemia nauplii* are supplied in an appropriate amount at a set time, unhatched eggs remain in a hatching tank without any change and continue to hatch and thus are eventually induced to hatch, and a hatching rate is increased to prevent of expensive *Artemia* cysts from being discarded and wasted In addition, according to the present embodiment, by introducing a tilted transparent membrane window that attenuates and blocks a water flow, the inflow of foreign materials such as egg shells and unhatched eggs can be 100% preventable, and purely collected larvae can cleanly cleansed and then supplied to a fry tank.

As such, the present invention is not limited to the described embodiments, and it is obvious to those skilled in the art that various modifications and changes can be made thereto without departing from the spirit and scope of the present invention. Therefore, it should be noted that such modifications or variations fall within the scope of the claims of the present invention.

[Description of reference numerals]

| | |
|---|---|
| 10: upper solid membrane | 11: lower solid membrane |
| 12: contact point gap | 17: upper LED light |
| 28: central passage | 31: shower |
| 32: brine supply tube | 33: linear motor |
| 37: fry rearing tank supply discharge port | 39: brine discharge portion |
| 46: brine reuse discharge port | 47: fresh water cleaning water discharge port |
| 50: hinge structure connection portion | 51: door plate |
| 100: tiled transparent membrane window | 200: Artemia hatching and supplying device |
| 300: back-to-back pushing door | |

The invention claimed is:

1. A fully-automated *Artemia* hatching and supplying system comprising:
an *Artemia* hatching and supplying device configured to automatically collect and supply *Artemia* larvae;
a tilted transparent membrane window optionally detachably connected to the *Artemia* hatching and supplying device, wherein the *Artemia* hatching and supplying device includes a hatching tank in which the *Artemia* larvae hatch from eggs, a collecting tank which collects only pure larvae and is connected to the hatching tank, and a quadrangular central passage which is adjunctively formed in a central portion of a rear wall of the hatching tank to spatially connect the hatching tank and the collecting tank; and
a back-to-back pushing door installed inside the collecting tank to block larvae from moving to the collecting tank during a hatching operation in the hatching tank.

2. A fully-automated *Artemia* hatching and supplying system comprising:
an *Artemia* hatching and supplying device configured to automatically collect and supply *Artemia* larvae; and
a tilted transparent membrane window optionally detachably connected to the *Artemia* hatching and supplying device,
wherein the *Artemia* hatching and supplying device includes a hatching tank in which the *Artemia* larvae hatch from eggs, a collecting tank which collects only pure larvae and is connected to the hatching tank, and a quadrangular central passage which is adjunctively formed in a central portion of a rear wall of the hatching tank to spatially connect the hatching tank and the collecting tank, and wherein the hatching tank includes a light-emitting diode (LED) light provided at an upper portion thereof, a submersible heater electric wire disposed under water to optionally generate heat, an air stone tube input portion, a detachable funnel mounting port configured to input resting eggs, and a cleaning discharge port provided at an end portion of a bottom of a lower portion thereof, wherein a silicone packing having a quadrangular shape are inserted into grooves in an inner wall of the central passage of the hatching tank and installed at a first entrance and a last entrance, and the tilted transparent membrane window is optionally inserted into the central passage.

3. The fully-automated *Artemia* hatching and supplying system of claim 1, wherein a fry rearing tank supply discharge port and a brine discharge portion are provided at a lower portion of the collecting tank.

4. The fully-automated *Artemia* hatching and supplying system of claim 1, wherein the collecting tank is fixed on an outer wall of the central passage of the hatching tank with a waterproof silicone packing inserted into a groove in the outer wall of the central passage and disposed therebetween using screw tightening, and a structure having a hinge structure connected to a passage is provided inside the collecting tank, wherein the structure having the hinge structure in the collecting tank is mounted by inserting a silicone packing into a quadrangular groove and has a hinge ring portion on an upper wall thereof so that a hinge ring portion of the back-to-back pushing door is connected and installed to engage therewith.

5. The fully-automated *Artemia* hatching and supplying system of claim 1, wherein the back-to-back pushing door is an submersible installation pressure opening/closing door which prevents culture water of the hatching tank from flowing in through a mounting passage for the tilted transparent membrane window during a process of discharging or supplying brine or fresh water from or to the collecting tank and opens a passage such that the *Artemia nauplius* hatching in the hatching tank move to the collecting tank, and the back-to-back pushing door operates to convert vertical downward movement, which is driven by a power of a motor outside water above the collecting tank, into horizontal movement and strongly push, press, and close a hinged door of the mounting portion for the tilted transparent membrane window.

6. The fully-automated *Artemia* hatching and supplying system of claim 5, wherein an upper portion of an upper arm portion of the back-to-back pushing door is connected to a linear motor and a lower portion thereof is connected to a lower arm portion, and the lower arm portion has a streamlined tension structure to maintain smooth pressing and elasticity and perform a pressing function.

7. The fully-automated *Artemia* hatching and supplying system of claim 1, wherein the back-to-back pushing door includes a transparent door plate connected to an upper wall of the central passage using a hinge and is closed when an inner protrusion having a quadrangular shape is inserted into a wall groove and is in close contact with a waterproof silicone packing.

8. The fully-automated *Artemia* hatching and supplying system of claim 1, wherein the tilted transparent membrane window is a quadrangular-shaped submersible window having a form in which a plurality of transparent upper solid membranes and a plurality of transparent lower solid membranes are bonded and disposed in a column to be vertically inclined inward at an angle of 70° to form contact point gaps having an interval of 1.5 mm, and through a method in which, as soon as *Artemia nauplii* hatch from eggs, the *Artemia nauplii* instinctively react to light to move in a direction of light, and as the *Artemia nauplii* instinctively move, the *Artemia nauplii* slide on a transparent membrane inclination surface) (70° to move, and the *Artemia nauplii* are guided to pass through the contact point gaps between the transparent upper solid membranes and the transparent lower solid membranes.

9. The fully-automated *Artemia* hatching and supplying system of claim 8, wherein through-holes having a diameter of 1 mm are formed in upper ceilings of upper end portions of central portions of the transparent upper solid membranes in the tilted transparent membrane window, and a silicone hose is connected to a first through-hole and drawn out to air above a water surface to be fixed to prevent air pockets from being generated inside the tilted transparent membrane window when brine is first supplied to the hatching tank.

* * * * *